United States Patent
Tamai (10) Patent No.: US 8,150,262 B2
(45) Date of Patent: Apr. 3, 2012

(54) OPTICAL COMMUNICATIONS NETWORK AND INTENSITY ADJUSTMENT METHOD FOR OPTICAL COMMUNICATIONS NETWORK

(75) Inventor: Hideaki Tamai, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 466 days.

(21) Appl. No.: 12/320,157

(22) Filed: Jan. 21, 2009

(65) Prior Publication Data

US 2009/0208211 A1    Aug. 20, 2009

(30) Foreign Application Priority Data

Feb. 20, 2008  (JP) .................................. 2008-038961

(51) Int. Cl.
*H04J 4/00*    (2006.01)

(52) U.S. Cl. .................. 398/77; 398/43; 398/67; 398/66

(58) Field of Classification Search .................... 398/77, 398/43, 67, 66
See application file for complete search history.

(56) References Cited

U.S. PATENT DOCUMENTS

| | | | | |
|---|---|---|---|---|
| 2006/0083515 A1* | 4/2006 | Hann et al. | ..................... | 398/87 |
| 2008/0056720 A1* | 3/2008 | Sitton et al. | ..................... | 398/98 |
| 2008/0089685 A1* | 4/2008 | Kazawa et al. | ................. | 398/66 |

OTHER PUBLICATIONS

GC Gupta, et al, "Hybrid WDM-CDM-PON for Ultra Long Reach Access Network," *European Conference on Optical Communication* (2006), We3.P.147, France.

* cited by examiner

*Primary Examiner* — Kinam Park
(74) *Attorney, Agent, or Firm* — Posz Law Group, PLC (57) ABSTRACT

An optical communications network in which one optical line terminal is connected to multiple optical network units and in which code division multiplexing communication is carried out between the optical line terminal and the optical network units. The optical intensities of upstream optical signals transmitted from each optical network unit are made constant at the time of multiplexing by an optical directional coupler, and the optical intensity of a downstream optical signal received by an optical network unit and an upstream optical signal received by the optical line terminal is contained within a dynamic range. Each optical network unit is provided with a variable optical attenuator that is common for an upstream optical signal and a downstream optical signal. The upstream optical signal and the downstream optical signal are attenuated by an equal attenuation. Moreover, the optical line terminal controls the attenuation at the variable optical attenuator.

20 Claims, 8 Drawing Sheets

| ONU No. | PRESENCE | RECEIVED POWER | RESET ATTENUATION |
|---|---|---|---|
| 1 | ○ | P1 | A1 |
| 2 | X | — | — |
| 3 | ○ | P3 | A3 |
| ⋮ | ⋮ | ⋮ | ⋮ |
| N | ○ | PN | AN |

OPTICAL COMMUNICATIONS NETWORK AND INTENSITY ADJUSTMENT METHOD FOR OPTICAL COMMUNICATIONS NETWORK

CROSS REFERENCE TO RELATED APPLICATION

The present application is related to, claims priority from and incorporates by reference Japanese Patent Application No. 2008-038961, filed on Feb. 20, 2008.

TECHNICAL FIELD

The present invention relates to an optical communications network. More particularly, the present invention relates to a passive optical network, or PON, using a code division multiplexing method and a method for adjusting the intensity of upstream optical signals and downstream optical signals in an optical communications network.

BACKGROUND

Figure 14:
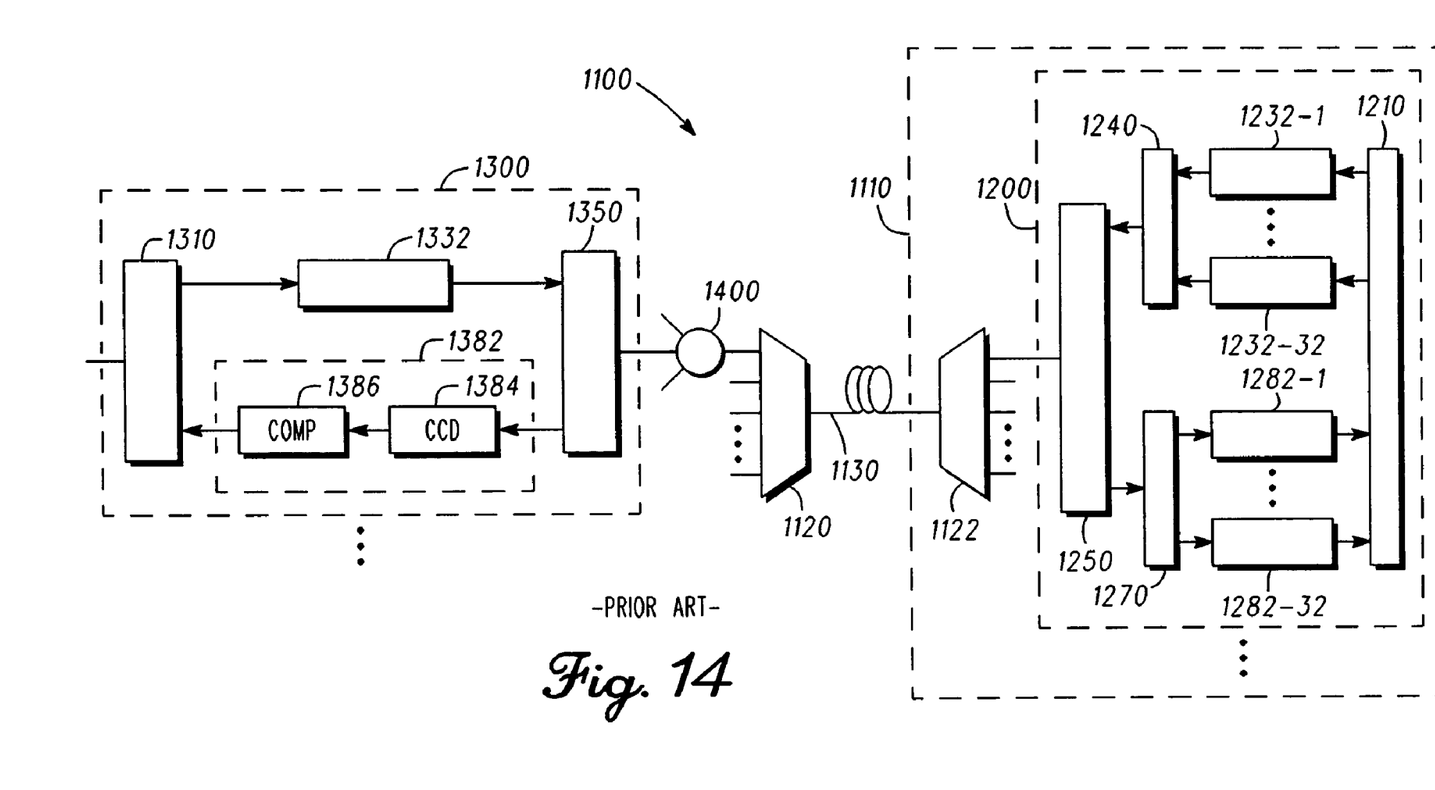
FIG. 14 is a schematic view of a conventional optical communications network in the related art.

FIG. 14 shows an optical communications network 1100 in which 10/100 BASE-TX signals having 32 channels are multiplexed by code division multiplexing, or CDM.

The optical communications network 1100 is a WDM-CDM-PON system, that is, a passive optical network (PON) using a combination of wavelength division multiplexing (WDM) technology and code division multiplexing (CDM) technology. An optical line terminal (OLT) 1200 is placed in a central office 1110, which is close to a key network, and an optical network unit (ONU) 1300 is placed on the subscriber side. A wavelength filter 1120 is provided on the ONU 1300 side, and the central office 1110 and the wavelength filter 1120 are connected by an optical fiber 1130. WDM-CDM signals sent from the central office 1110 to the ONU 1300 are branched at the wavelength filter 1120 for each wavelength, which is then sent to an optical coupler 1400.

Multiple ONUs, represented by the ONU 1300, are connected to the optical coupler 1400. For purposes of discussion, the 32 ONUs connected to the optical coupler 1400 and a single OLT 1200 constitutes one group.

The same wavelength is used for upstream communication within a group from ONU 1300 to OLT 1200 and downstream communication from the OLT 1200 to the ONU 1300 using CDM technology. A different wavelength is allotted to each group, and wavelengths are separated or multiplexed at the wavelength filter 1120 and an intra-office filter 1122 provided inside the central office 1110 in each group.

The OLT 1200 includes an interface 1210. Between the interface 1210 and the key network, packets are transmitted and received, frames generated and packets extracted. There are 32 types of codes that are allotted to encoders 1232-1~32. The encoders 1232-1~32 convert downstream frames into code spread signals. The code spread signals are added by a multiplexed adder 1240 to generate code division multiplexing (CDM) signals. The CDM signals are converted into CDM optical signals by an optical module 1250 and then transmitted to the ONU 1300. The CDM optical signals generated at each OLT 1200 are wavelength-multiplexed by the intra-office filter 1122 and then sent to the ONU 1300 as WDM-CDM signals.

The wavelength filter 1120 separates WDM-CDM signals, and each of the separated CDM optical signals is sent to the optical coupler 1400. The CDM optical signals are branched into 32 optical signals by the optical coupler 1400 and sent to each ONU 1300.

At each ONU 1300, the optical module 1350 converts CDM optical signals into CDM electric signals, which are then sent to a decoder 1382, composed of a CCD matched filter 1384 and a comparator 1386.

The CCD matched filter 1384 convolutes codes allotted to the decoder 1382 for CDM electric signals. The comparator 1386 reproduces a downstream frame based on the convoluted result at the CCD matched filter 1384. Afterwards, a packet extracted from the frame is sent to a user terminal via an interface 1310.

On the other hand, signals from a user terminal are received by the interface 1310 of the ONU 1300, encoded by the encoder 1332 and then converted to optical signals at the optical module 1350. These optical signals are multiplexed at the optical coupler 1400 to become CDM optical signals, wavelength-multiplexed at the wavelength filter 1120 and then sent to the central office 1110 as WDM-CDM signals. These WDM-CDM signals are wavelength-separated to CDM optical signals by the central office filter 1122 and then sent to the OLT 1200.

The OLT 1200 converts the CDM optical signals to CDM electrical signals at the optical module 1250, splits the electric signals at a splitter 1270 and then sends them to decoders 1282-1~32. The decoders 1282-1~32, which are each composed of a CCD matched filter and a comparator like the decoder 1382 in the ONU 1300, reproduce an upstream frame from an electric signal. The upstream packet is transmitted to the key network via the interface 1210.

In theory, components (cross correlation components) from another channel become zero at the time of decoding on the receiving side in the CDM communication using an orthogonal code set. In practice, however, they do not become completely zero due to the imperfection of a device or the like. Accordingly, if the light intensity of another channel is large relative to that of the object channel to be decoded, the cross correlation components may cause a large amount of noise, which prevents the extraction of autocorrelation components.

The attenuation of an optical fiber is about 0.5 dB/km. If a distance from an optical demultiplexer is different by 10 km between ONU-1 and ONU-2, for example, light intensity differs by about 5 dB. In the case that a coverage (dynamic range or reception range) is about 5 dB on the receiving side, a downstream optical signal received by ONU and an upstream optical signal received by OLT depart from the dynamic range if a distance from the optical demultiplexer is 10 km or more. As a result, an optical signal cannot be received normally.

In view of the above, there is a need for making the optical intensity of an upstream optical signal transmitted from each ONU constant at the time of multiplexing at an optical directional coupler by providing a variable optical attenuator that is common for an upstream optical signal and a downstream optical signal, giving the same attenuation to the upstream optical signal and the downstream optical signal and controlling the attenuation in the variable optical attenuator by an OLT. Moreover, there is a need to contain optical intensity of a downstream optical signal received by an ONU and an upstream optical signal received by an OLT within a dynamic range.

SUMMARY

In view of the aforementioned limitations and needs, an optical communications network includes a plurality of optical network units each including a variable optical attenuator for attenuating a received downstream optical signal and a transmitted upstream optical signal, a transceiver for extracting a downstream control signal from the downstream optical signal and generating the upstream optical signal from an upstream control signal, and an optical network unit controller. Also, an optical line terminal is in code division multiplexing communication with the plurality of optical network units and includes an optical intensity measuring device for measuring the intensity of a received upstream optical signal, a memory for storing a control table having information about the plurality of optical network units readably and writably, a transceiver for extracting the upstream control signal from the upstream optical signal and generating the downstream optical signal from the downstream control signal, and an optical line terminal controller. The control table is configured to store information about a received intensity of an upstream optical signal received from each of the plurality of optical network units and a preset attenuation in the variable optical attenuator at each of the plurality of optical network units that enables the optical line terminal to set an attenuation of the variable optical attenuator at each of the plurality of optical network units.

An optical network unit includes a variable optical attenuator for attenuating a received downstream optical signal and a transmitted upstream optical signal, a transceiver for extracting a downstream control signal from a downstream optical signal and for generating an upstream optical signal from an upstream control signal, and an optical network unit controller.

The optical line terminal includes an optical intensity measuring device for measuring the intensity of a received upstream optical signal, a memory for storing a control table having information about the optical network units readably and writably, a transceiver for extracting an upstream control signal from an upstream optical signal and generating a downstream optical signal from a downstream control signal and an optical line terminal controller. The control table stores information about the received intensity of an upstream optical signal received from each of the multiple optical network units and the preset attenuation in the variable optical attenuator at each optical network unit.

The optical line terminal controller includes an object optical network unit setup means, an upstream control data extraction means, a reference intensity setup means, an intensity acquisition means, a control table renewal means, an intensity comparison means, an attenuation setup means and a downstream control signal generation means.

The object optical network unit setup means sets an object optical network unit to be controlled. The upstream control data extraction means extracts information about the current attenuation of the object optical network unit contained in an upstream control signal. The reference intensity setup means sets the reference intensity of an upstream optical signal received from the optical network unit. The intensity acquisition means acquires the reception intensity of an upstream optical signal measured by an optical intensity measuring device. The control table renewal means renews information about the preset attenuation and received intensity in the control table. The intensity comparison means compares the reference intensity with the reception intensity. The attenuation setup means sets the preset attenuation in the control table or an attenuation obtained by changing the preset attenuation as a setup attenuation. The downstream control signal generation means generates a downstream control signal that allows providing direction to the object optical network unit about the change of the attenuation at the variable optical attenuator into the setup attenuation.

Moreover, another exemplary embodiment provides a method for adjusting intensity in an optical communications network in which one optical line terminal is connected to multiple optical network units and the code division multiplexing communication is carried out between the optical line terminal and the optical network units.

According to the optical communications network and method for adjusting intensity of the present invention, optical intensity can be made constant at the time of multiplexing at an optical directional coupler by giving each optical network unit (ONU) an attenuation that is common for an upstream optical signal and a downstream optical signal and controlling the attenuation by the optical line terminal (OLT). Moreover, the optical intensity of a downstream optical signal received by the ONU and an upstream optical signal received by the OLT can be contained within a dynamic range.

DETAILED DESCRIPTION

The following is a description of various exemplary embodiments with reference to drawings. Each drawing is only schematic so that the invention can be comprehended. Also, the numerical conditions are only preferred examples. Accordingly, the present invention is not limited to the following exemplary embodiments. The present invention includes many variations and alterations that allows for achieving the effect of the invention without departing from the scope of the invention.

(Network Configuration)

Figure 1:
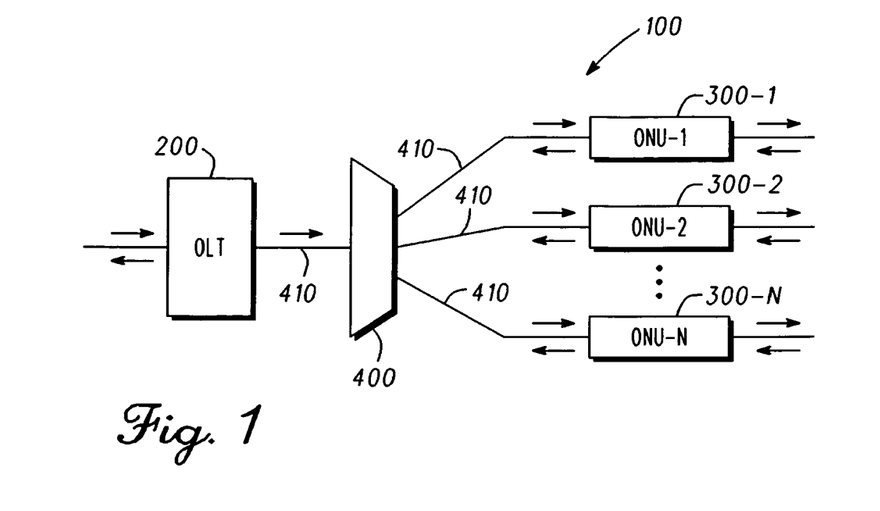
FIG. 1 is a schematic view of an optical communications network of the preferred embodiment.
Figure 2:
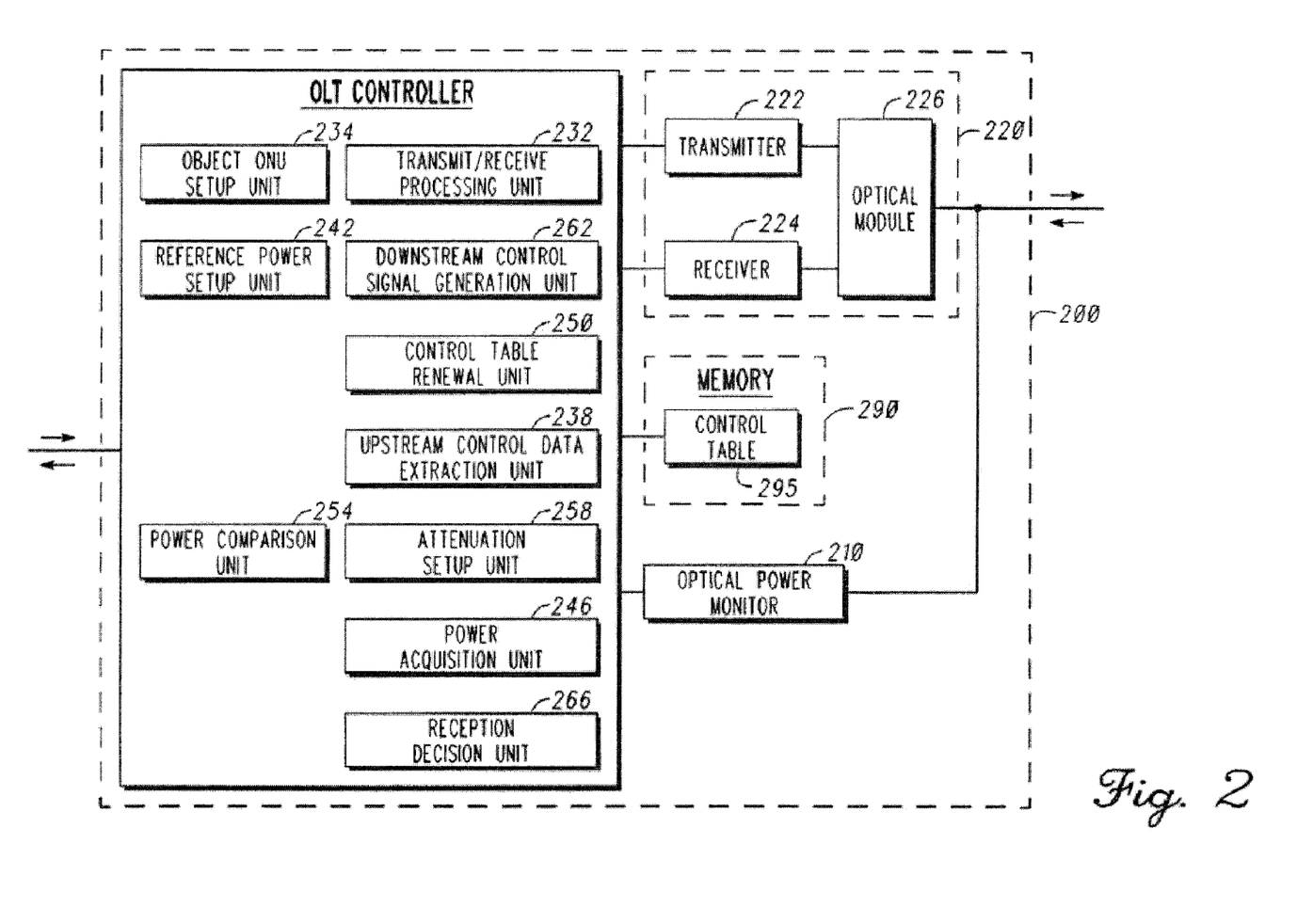
FIG. 2 is a schematic view of an optical line terminal, or OLT of the preferred embodiment.
Figure 3:
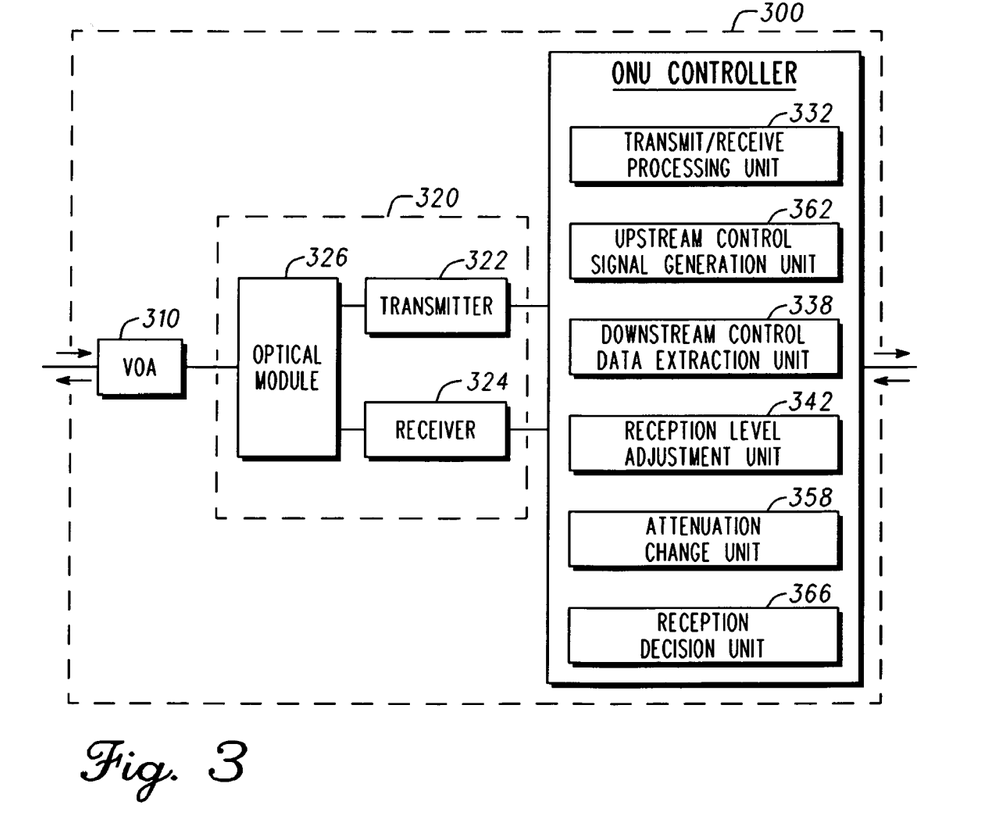
FIG. 3 is a schematic view of an optical network unit, or ONU of the preferred embodiment.

The following is a description of the configuration of an exemplary optical communications network with reference to FIGS. 1-3. An optical communications network 100 includes one optical line terminal (OLT) 200 and multiple optical network units (ONUs) 300-1~N, with N being an integer of 2 or more).

The OLT 200 is connected to the ONUs 300-1~N via optical fibers 410 branched by an optical directional coupler 400. The OLT 200 is connected to a key network such as the Internet (not shown). As shown in FIG. 2, the OLT 200 includes an OLT controller 230, a transmit/receive part (transceiver) 220, an optical intensity measuring part (optical power monitor) 210 and a memory 290.

The transceiver 220 includes a transmitter 222, a receiver 224 and an optical module 226. The transmitter 222 includes an encoder and a multiplexed adder, for example, and generates code division multiplexing signals. The configuration of the transmitter 222 including an encoder and a multiplex adder may be the same as one conventionally used for a communications system based on CDM technology.

The receiver 224 includes a splitter and a decoder, for example, and extracts a frame from code division multiplexing signals. The decoder may include a conventionally well-known charge coupled device (CCD) matched filter and comparator such as described in FIG. 14.

The optical module 226 executes electro-optical (E/O) conversion and opto-electrical (O/E) conversion and includes a conventionally well-known laser diode (LD) and photo diode (PD), for example. Here, the LD performs the E/O conversion and the PD performs the O/E conversion. Further here, the electro-optical (E/O) conversion means that an electric signal is transformed into an optical signal, and the opto-electrical (O/E) conversion means that an optical signal is transformed into an electric signal.

The optical power monitor 210 may be any conventionally well-known monitor as long as it has the function of measuring the intensity of received upstream optical signals and transmitting the results to the OLT controller 230.

The OLT controller 230 includes, as functional units, a transmit/receive processing unit 232, an object ONU setup unit 234, an upstream control data extraction unit 238, a reference power setup unit 242, a power acquisition unit 246, a control table renewal unit 250, a power comparison unit 254, an attenuation setup unit 258, a downstream control signal generation unit 262 and a reception decision unit 266. The OLT controller 230 including these functional units may have any proper configuration such as a field programmable gate array (FPGA) or a micro processing unit (MPU). In the case that the OLT controller 230 is an MPU, the central processing unit (CPU) of MPU performs each functional unit by reading a program from ROM or the like and running the program.

In FIG. 2, the memory 290 is provided separately from the OLT controller 230. However, the memory 290 may be provided inside the OLT controller 230. Each of the functional means of the OLT controller 230 of the OLT 200 will be discussed in detail below.

Referring to FIG. 3, the exemplary ONU 300 is connected to a communication terminal such as a PC (not shown). For purposes of discussion, the ONU 300 will be referred to as being representative of each of the ONUs 300-1~N. The ONU 300 includes an ONU controller 330, a transmit/receiver part, or transceiver, 320 and a variable optical attenuator (VOA) 310. The VOA 310 provides an attenuation having the same value for both an upstream optical signal and a downstream optical signal.

The transceiver 320 includes a transmitter 322, a receiver 324 and an optical module 326. The transmitter 322 includes an encoder, for example, and generates code spread signals. The configuration of the receiver 322 including an encoder may be the same as one conventionally used for a communications system based on CDM technology.

The receiver 324 includes a decoder, for example, and extracts a frame from code division multiplexing signals. The decoder may include a conventionally well-known CCD matched filter and comparator such as described in FIG. 14.

The optical module 326 executes E/O conversion and O/E conversion and includes a conventionally well-known LD and PD, for example.

The ONU controller 330 includes, as functional units, a transmit/receive processing unit 332, a downstream control data extraction unit 338, a reception level adjustment unit 342, an attenuation change unit 358, an upstream control signal generation unit 362 and a reception decision unit 366. The ONU controller 330 including these functional units may have any proper configuration such as an FPGA or MPU. In the case that the ONU controller 330 is an MPU, the CPU of MPU performs each functional unit by reading a program from ROM or the like and running the program.

Each of the functional units of the ONU controller 330 will be discussed in detail below.

Between the OLT 200 and the ONU 300, downstream communication occurs from the OLT 200 to the ONU 300 and upstream communications from the ONU 300 to the OLT 200. As a result, packets are transmitted and received between the key network and each communication terminal.

The following is a brief description of an exemplary downstream communication.

The OLT 200 receives a downstream packet from the key network. The transmit/receive processing unit 232 of the OLT controller 230 converts the packet to a downstream frame suitable for CDM by adding a header to the packet. The transmitter 222 generates a CDM signal by applying CDM technology to the downstream frame. The optical module 226 performs E/O conversion for the CDM signal to generate a downstream optical signal. The downstream optical signal is branched by the optical directional coupler 400 and transmitted to each ONU 300-1~N.

At the ONU 300, the VOA 310 attenuates the received downstream optical signal. The attenuated downstream optical signal is transmitted to the transceiver 320. The optical module 326 performs the O/E conversion for the downstream optical signal to generate a CDM electrical signal. The CDM electrical signal is decoded at the receiver 324. As a result, a downstream frame addressed to the unit is extracted. The transmit/receive processing unit 332 of the ONU controller 330 removes the header from the downstream frame to extract a downstream packet. The downstream packet is transmitted to a communication terminal from the ONU 300.

The following is a brief description of an exemplary upstream communication.

The ONU 300 receives an upstream packet from a communication terminal. The transmit/receive processing unit 332 of the ONU controller 330 generates an upstream packet by adding a header to the received upstream packet. The upstream frame is modulated to a code spread signal at the transmitter 322 and then converted to an upstream optical signal at the optical module 326.

The upstream optical signal is attenuated at the VOA 310 and then transmitted to the OLT 200. Upstream signals sent to the OLT 200 from the ONU 300 are multiplexed at the optical directional coupler 400 and then transmitted to the OLT 200.

At the OLT 200, the optical module 226 performs the O/E conversion for the upstream optical signal to generate an upstream electrical signal. The upstream electrical signal is decoded at the receiver 224 and then converted to an upstream frame. The transmit/receive processing unit 232 of the OLT controller 230 extracts an upstream packet by removing the header from the upstream frame and then transmits the upstream packet to the key network.

The optical power monitor 210 of the OLT 200 measures the intensity of an upstream optical signal and sends the measured result to the OLT controller 230.

Next, an intensity setup method, or in other words a method for setting attenuation at the VOA 310, will be described. The attenuation is set as follows: a downstream control signal is transmitted from the OLT 200 to the ONU 300 by making reference to the control table 295 stored in the memory 290 of the OLT 200. The ONU 300 changes its VOA 310 in response to the received downstream control signal and then transmits the result to the OLT 200.

The control table, downstream control signal and upstream control signal will now be described.

Figure 4:
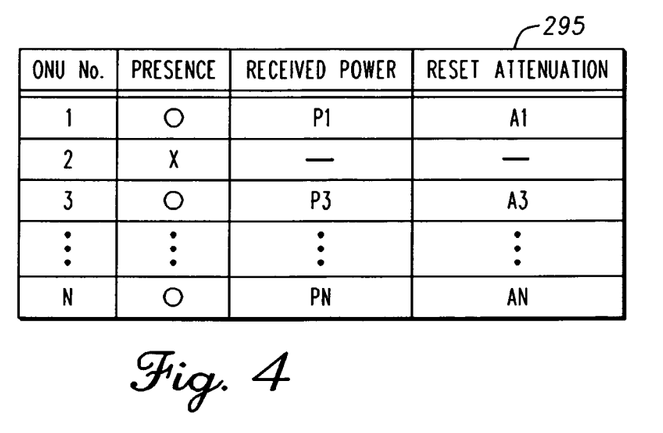
FIG. 4 is a pattern diagram showing an exemplary configuration of a control table shown in FIG. 2.

FIG. 4 is a pattern diagram showing an exemplary configuration of the control table. The control table stores information about presence, received power and preset attenuation for each ONU 300.

The presence column shows the presence or absence of a received upstream optical signal. For example, if an upstream control signal has been received, the presence column shows the mark "O," and if it has not been received, the presence column shows the mark "X."

The received power column shows reception power Pi (wherein "i" is an integer of 1 or above, but equal to or the less than N) of an upstream optical signal containing an upstream control signal measured by the optical power monitor 210 if an upstream optical signal has been received. The preset attenuation column shows preset attenuation Ai, which has currently been set at the VOA 310 of the ONU 300.

Figure 5A:
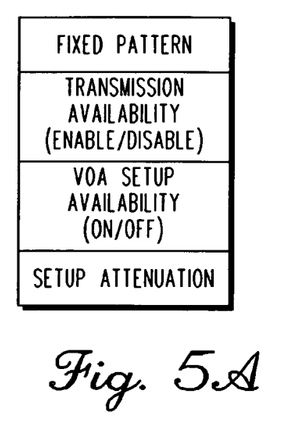
FIG. 5 is a pattern diagram showing an exemplary configuration of a downstream control signal and an upstream control signal.
Figure 5B:
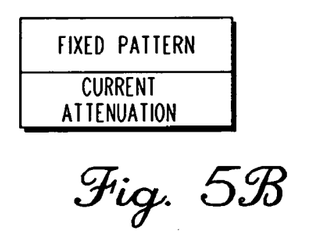

FIG. 5A is a pattern diagram showing an exemplary configuration of downstream control signals. FIG. 5B is a pattern diagram showing an exemplary configuration of upstream control signals.

A downstream control signal contains information about a fixed pattern, transmission availability, VOA setup availability and setup attenuation. A downstream control signal is repeatedly transmitted while intensity adjustment is being performed.

The fixed pattern is used to detect the header of a downstream control signal. The fixed pattern is also used to determine the existence of a received downstream optical signal at the ONU 300. If the fixed pattern has regularly been received, the decision will be "reception OK." If it has not regularly been received, the decision will be "reception NG."

The transmission availability shows whether or not an output is allowed for an upstream optical signal from the ONU 300. If the transmission setup is "enable," the ONU 300 will be allowed to output a signal. If it is "disable," the ONU 300 is not allowed to output a signal.

The VOA setup availability shows which of the ONU 300 and the OLT 200 decides attenuation at the VOA 310 of the ONU 300. The setup attenuation shows the attenuation to be set at the VOA 310.

If the VOA setup availability is "ON," the ONU 300 will change the attenuation to a value of the setup attenuation. On the other hand, if the VOA setup availability is "OFF," the ONU 300 does not reflect a value of the setup attenuation but sets the VOA 310 on its own.

In contrast, an upstream control signal contains information about a fixed pattern and a current attenuation. An upstream control signal is transmitted at a time when the aforementioned transmit allowance of a downstream control signal shows "enable."

The fixed pattern is used to detect the head of an upstream control signal. The fixed pattern is also used to decide the existence of a received upstream optical signal at the OLT 200. At the OLT 200, if the fixed pattern has regularly been received, the decision will be "reception OK." If it has not regularly been received, the decision will be "reception NG."

The current attenuation shows the attenuation currently set at the VOA 310.

Next, a process for attenuation setup will be described. The setup of attenuation may normally be performed at a time when the power sources of each ONU 300-1~N and the OLT 200 are turned on or at a time when the configuration of the optical communications network is changed. However, it may also be performed on a regular basis (e.g. at a fixed time every day).

Figure 6:
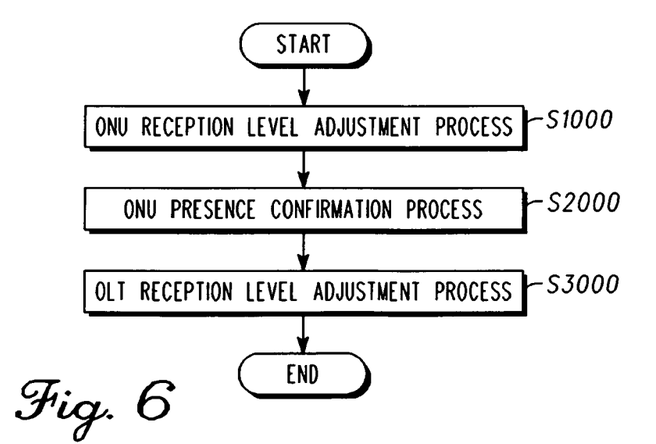
FIG. 6 is a view showing a flow diagram of attenuation setup.

FIG. 6 is a flow diagram of the attenuation setup process.

A method for setting up attenuation includes adjustment of an ONU reception level at S1000, confirmation of an ONU presence at S2000 and an adjustment of an OLT reception level at S3000.

The ONU reception level adjustment at S1000 starts by turning on the power source of the ONU 300. Here, the power source of the OLT 200 is turned on after the power source of the ONU 300 is turned on according to the present description. However, the order in which the power sources are turned on is not fixed. Either one can be turned on first. After the power source of the ONU 300 is turned on, the ONU 300 waits for a signal from the OLT 200. On the other hand, at a time when the power source of the OLT 200 is turned on, the OLT 200 generates a downstream control signal for the ONU reception level adjustment and starts transmitting it to the ONU 300.

At the time of setting up attenuation, the downstream control signal generation unit 262 of the OLT 200 generates a downstream control signal for controlling the ONU 300. The downstream control signal is converted to a downstream optical signal at the transceiver 220 of the OLT 200 and then transmitted to the ONU 300.

The transceiver 320 of the ONU 300 extracts a downstream control signal from the received downstream optical signal. The ONU controller 330 performs processing based on the downstream control signal. The upstream control signal generation unit 362 generates an upstream control signal showing the state of the ONU 300. The upstream control signal is converted to an upstream optical signal at the transceiver 320 and then transmitted to the OLT 200.

The transceiver 220 of the OLT 200 extracts the upstream control signal from the upstream optical signal. The OLT controller 230 performs processing based on the upstream control signal.

Figure 7:
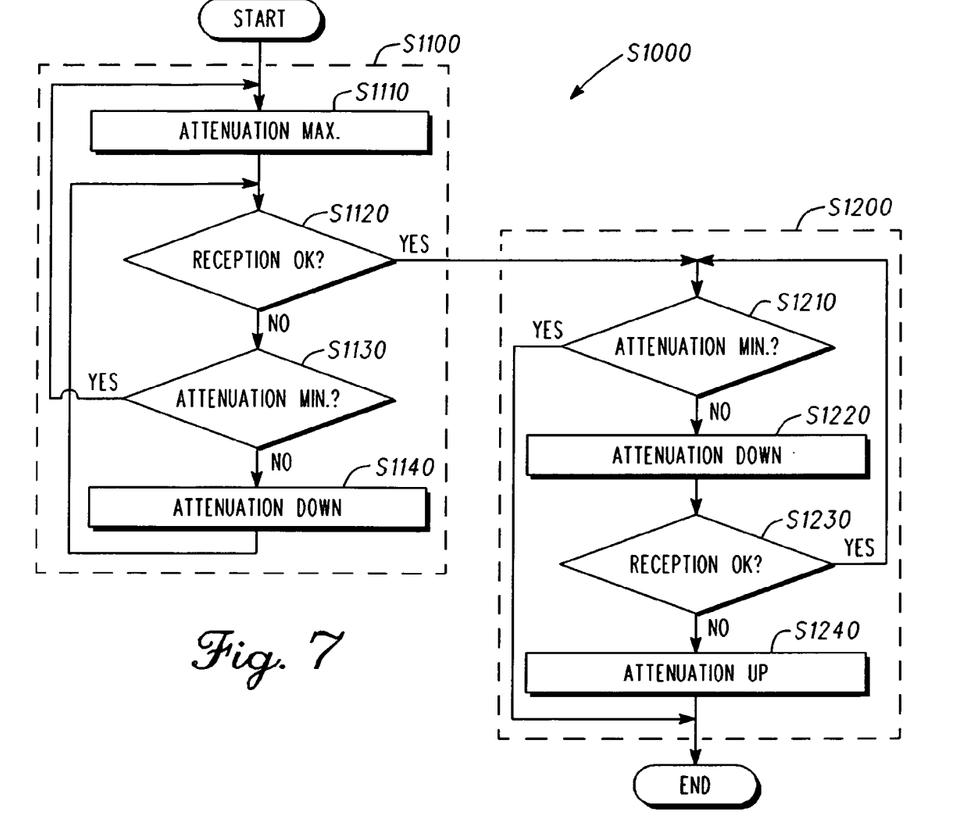
FIG. 7 is a view showing a flow diagram of an ONU reception level adjustment process.

The following is a description of the ONU reception level adjustment process at S1000 with reference to FIG. 7, which shows the processing of the ONU reception level adjustment at S1000.

The ONU reception level adjustment process at S1000 includes reception confirmation process at S1100 and level setup process at S1200, which are performed in this sequence.

In the ONU reception level adjustment process at SI000, the downstream control signal generation unit 262 of the OLT 200 generates a downstream control signal for the ONU reception level adjustment and sends it to the ONU 300. At this downstream control signal, the transmission setup is "disable" and the VOA setup "OFF." The downstream control signal for the ONU reception level adjustment is repeatedly transmitted while the ONU reception level adjustment is being performed. The ONU 300 sets its reception level in response to the downstream control signal.

The reception confirmation process at S1100 includes the following steps S1110~S1140.

At S1110, the reception level adjustment unit 342 sets attenuation to a maximum (MAX). The attenuation change unit 358 transmits the attenuation set by the reception level adjustment unit 342 to the VOA 310. The VOA 310 changes its attenuation in accordance with the received attenuation value and gives an equal attenuation to the transmit/receive optical signals.

The maximum and minimum values of attenuation are determined by the specification of the VOA 310 and written in a memory (not shown) of the ONU controller 330 readably.

The reception level adjustment unit 342 reads the maximum attenuation from the memory to set up attenuation.

Next, at S1120, the reception decision unit 366 judges the existence of a received downstream control signal. The reception decision unit 366 of the ONU controller 330 makes this judgment based on whether or not a fixed pattern has been received regularly.

If a downstream control signal has been received (Yes), the reception confirmation process at S1100 comes to an end. Then, the level setup process at S1200 is carried out. If no downstream control signal has been received (No), the process moves on to S1130.

At S1130, the reception level adjustment unit 342 judges whether or not the attenuation is minimal (MIN). In this judgment, the reception level adjustment unit 342 reads out a minimum value from the memory and compares it with the setup attenuation.

If the attenuation is found minimal as a result of the judgment (Yes), the process repeats at S1110. On the other hand, if the attenuation is not minimal (No), the attenuation is reduced by one stage at S140 (attenuation DOWN). The size of one stage for changing attenuation may be set in an appropriate manner depending on a variable range of the VOA 310 and a reception range of the ONU 300.

For example, if the variable range of the VOA 310 is 0~30 dB, the minimum attenuation is 0 dB and the maximum attenuation 30 dB. If the reception range of the ONU 300 is 5 dB, one stage may be set at 1 dB. In order to shorten processing time, the size of one stage may be increased. On the contrary, the size of one stage may be decreased in order to enhance accuracy.

After reducing attenuation by one stage, the process repeats at S1120.

The reception confirmation process at S1100 is repeated until a downstream control signal is received.

After the reception of a downstream control signal is confirmed, the process moves on to the level setup process at S1200. The level setup process at S1200 includes the following steps S1210~1240.

First, the reception level adjustment unit 342 judges whether or not attenuation is minimal (MIN). This judgment is made in the same manner as S1130. If the attenuation is a minimum attenuation (Yes), the level setup process S1200 comes to an end. Here, the attenuation of VOA 310 is set to the minimum attenuation.

On the other hand, if the attenuation is not a minimum attenuation (No), the attenuation is reduced by one stage at S1220. S1220 is carried out in the same way as S1140.

Next, the reception decision unit 366 judges the existence of a received downstream control signal at S1230. This judgment is made in the same way as S1120.

If a downstream control signal has been received (Yes), the process repeats at S1210. On the other hand, if no downstream control signal has been received (No), the process moves on to S1240.

At S1240, attenuation is increased by one stage. One stage is set to the same size as that of S1140 and S1220. After S1240, the level setup process 1200 (i.e. the ONU reception level adjustment process S1000) comes to an end.

Figure 8:
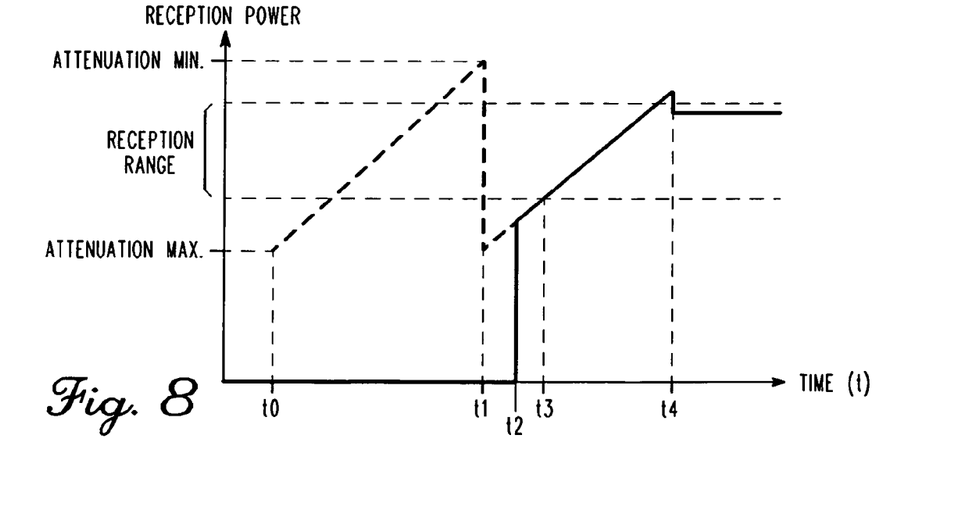
FIG. 8 is a pattern diagram (1) showing the ONU reception level adjustment process.
Figure 9A:
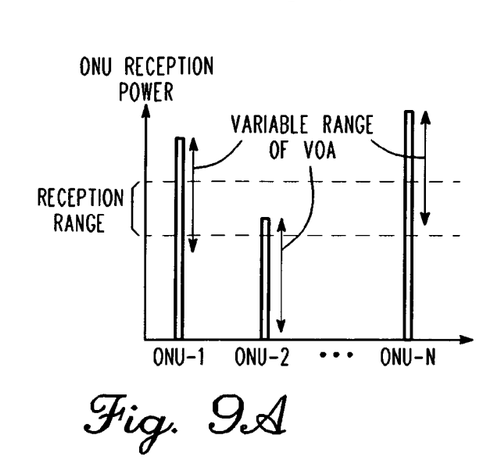
FIG. 9 is a pattern diagram (2) showing the ONU reception level adjustment process.
Figure 9B:
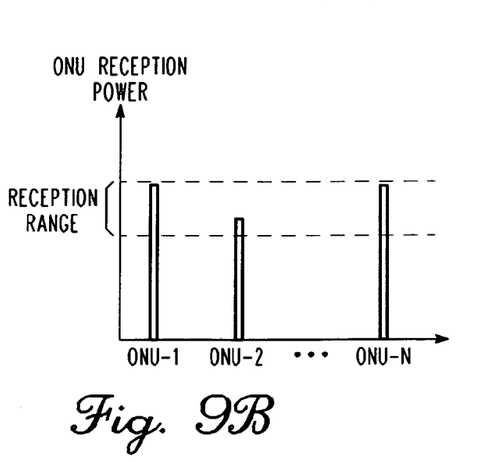

FIGS. 8, 9A and 9B are pattern diagrams of the ONU reception level adjustment. FIG. 8 shows the change of reception power for one ONU while the ONU reception level adjustment has been carried out. In FIG. 8, time (t) is measured along the horizontal axis and reception power is measured along the longitudinal axis. FIG. 9A shows reception power for each ONU before the ONU reception level adjustment process S1000. FIG. 9B shows reception power for the ONU 300 after the ONU reception level adjustment process S1000.

First, the power source of the ONU 300 is turned on at time t0. At that time, attenuation is maximum (i.e. reception power is minimal) by performing S1110. Afterwards, attenuation is reduced by one stage at a time by performing S1120~S1140 until it reaches a minimum value. If no downstream control signal is received before attenuation reaches a minimum value, attenuation is made maximum by performing S1110 at a time when attenuation has reached a minimum (time t1).

A downstream optical signal is transmitted at time t2 by turning on the power source of the OLT 200. However, the downstream optical signal cannot be received while attenuation is large because it is outside a reception range.

At a time when the power of a received optical signal comes within a range at time t3, S1120 decides "reception OK." Afterwards, the level adjustment at S11200 is carried out. At this point, attenuation is reduced by one stage at a time while a downstream signal is receivable.

If the reduction of attenuation has resulted in "reception NG" (at time t4), that is, if the reception power has exceeded a reception range, attenuation is raised by one stage, whereby the process comes to an end.

On the other hand, if attenuation has reached a minimum value in the state of "reception OK" as a result of reducing attenuation by one stage at a time, the process comes to an end at that point.

By this ONU reception level setup step, the reception level of the ONU 300 comes to have a maximum settable value within a reception range as shown in FIG. 9B.

The ONU presence confirmation at S2000 is carried out following the ONU reception level adjustment process at S1000.

Figure 10:
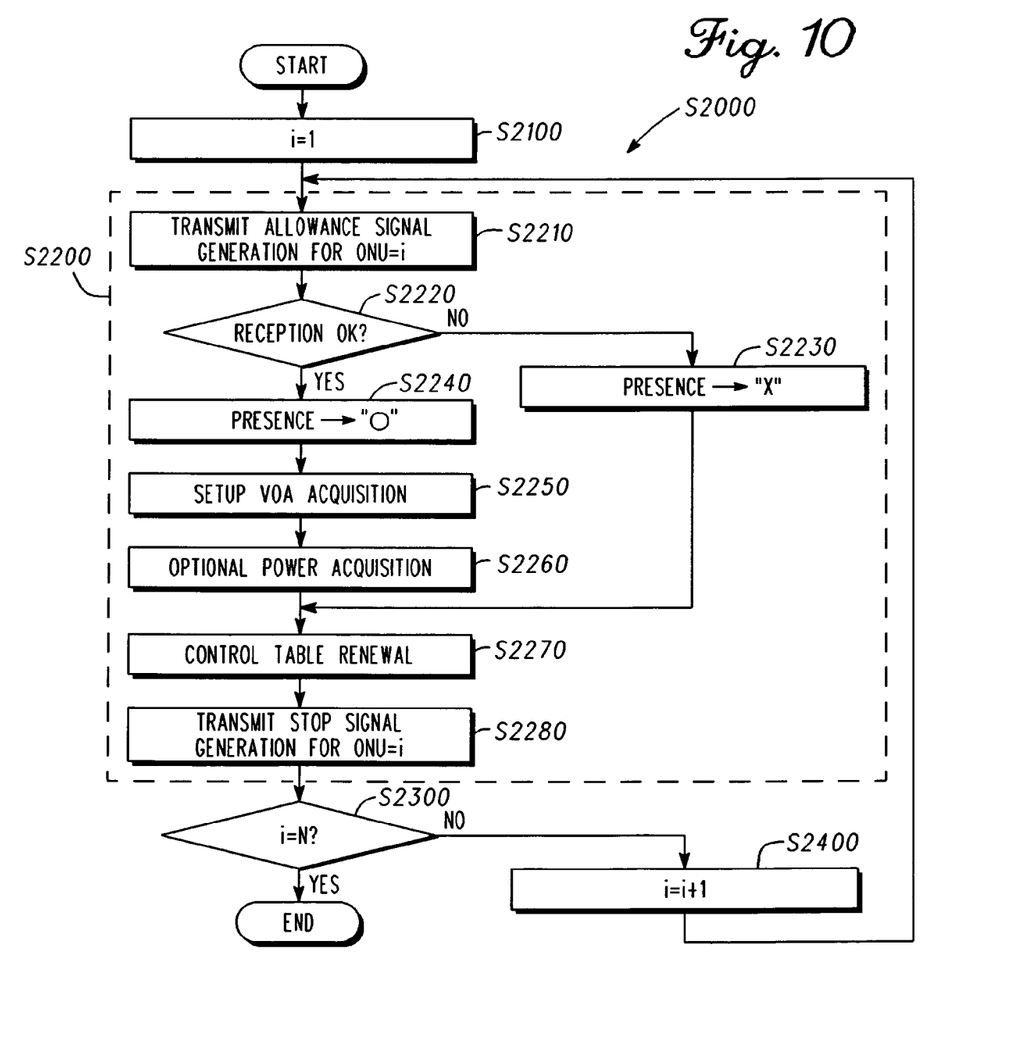
FIG. 10 is a view showing a flow diagram of an ONU presence confirmation process.
Figure 11:
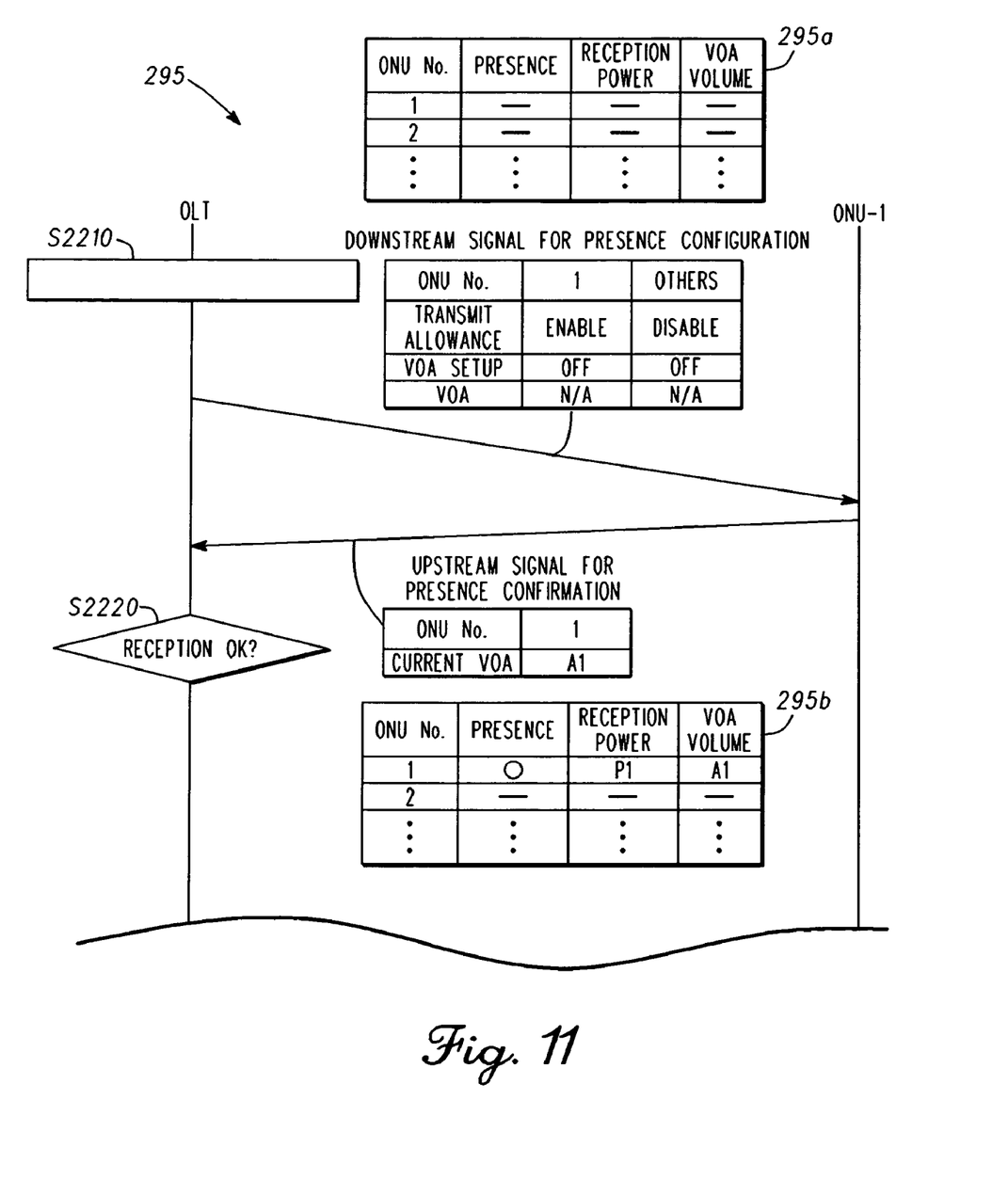
FIG. 11 is a sequence diagram showing the ONU presence confirmation process.

The following is a description of the ONU presence confirmation with reference to FIGS. 10 and 11. FIG. 10 is a flow diagram showing the ONU presence confirmation process. FIG. 11 is a sequence diagram in the ONU presence confirmation.

In the ONU presence confirmation process S2000, the OLT 200 generates a downstream control signal for ONU presence confirmation and sends it to the ONU 300. Here, the transmission setup is made "enable" for each channel one by one and the attenuation setup is "OFF."

The ONU presence confirmation process S2000 starts at a time when a specific time set in advance at the OLT has elapsed after the start of the ONU reception level adjustment process at S1000. This specific time is determined in accordance with a cycle period of a downstream control signal and the number of variable steps at the VOA 310. For example, given that time required for reception confirmation is 500 As and that the VOA 310 has 30 variable steps, a wait time is sufficiently longer than 15 ms (=500 μs×30).

First, i=1 in S2100. It means that the object ONU setup unit 234 has decided ONU 300-1 as the object optical network unit (object ONU) of all the multiple ONU 300-*i* (wherein i is an integer of not less than 1 and not more than N).

Next, individual presence confirmation process is carried out for each ONU at S2200.

The downstream control signal generation unit 262 generates a downstream control signal for presence confirmation for ONU-1. Here, the transmission availability is "enable" for ONU-1 and "disable" for the other ONUs.

The ONU 300-1 receives the downstream control signal for presence confirmation from the OLT 200. The downstream control data extraction unit 338 of the ONU 300-1 extracts downstream control information from the downstream control signal. The ONU, for which information about transmission availability contained in the downstream control information is "enable" (i.e. ONU-1 in this example), generates an upstream control signal and transmits it to the OLT 200. The current attenuation of the upstream control signal for presence confirmation shows attenuation set at the current VOA 310.

If the configuration of an optical module in the OLT 200 is the same as that in the ONU, the attenuation of an upstream signal is equal to that of a downstream signal. The OLT can therefore receive an upstream control signal.

At S2220, the reception decision unit 266 judges the existence of a received upstream control signal.

If an upstream control signal has been received (Yes), the presence column of the control table 295 will have the mark "O," for example, at S2240. At S2250, the upstream control data extraction unit 238 acquires the current attenuation contained in the upstream control signal. At S2260, the power acquisition unit 246 acquires the optical intensity of the received signal measured by the optical power monitor 210. Here, the sequence of steps S2240~S2260 is not so relevant for this preferred embodiment. Any sequence is allowed.

Next, at S2270, the control table renewal unit 250 renews the control table 295. FIG. 11 shows the control table before renewal 295*a* and the control table after renewal 295*b*.

On the other hand, if it is found as a result of the judgment at S2220 that no upstream control signal has been received, the presence column of the control table 295 will have the mark "X," for example, at S2230. Afterwards, the control table 295 will be renewed at S2270.

Next, at S2280, the transmit allowance of a downstream control signal is made "disable" for ONU 300-1 in order to stop transmission to the ONU 300-1. These steps S2210-S2280 confirm the presence of ONU 300-1.

Afterwards, at S2300, the object ONU setup unit 234 judges whether or not i=N. This decision allows confirming if the presence confirmation has been carried out for all the ONUs 300-1~N.

If it is found as a result of the judgment at S2300 that i is not equal to N (No), 1 will be added to i at S2400 and the individual presence confirmation process S2200 is repeated. In other words, after completing the presence confirmation for ONU 300-1, the presence confirmation for ONU 300-2, ONU 300-3, ONU 300-4, and so on will be executed. At a time when the presence confirmation is completed for ONU 300-N (i.e. at a time when the presence confirmation is completed for all the ONUs 300-1~N), the ONU presence confirmation process at S2000 comes to an end.

Figure 12:
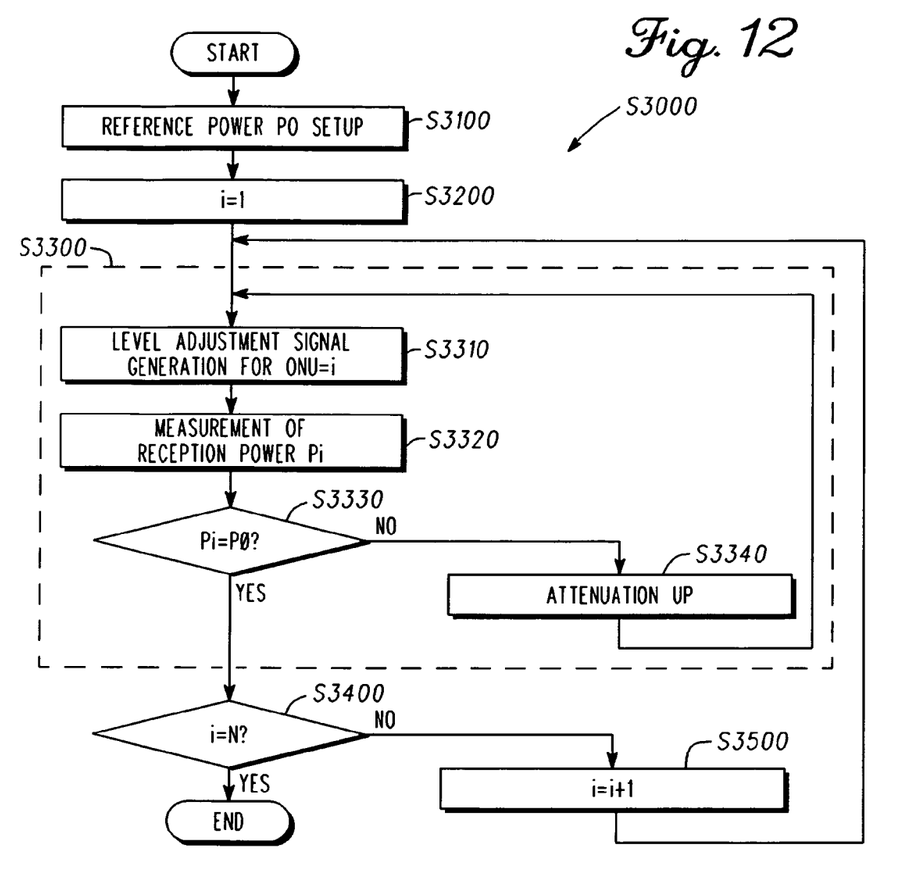
FIG. 12 is a view showing a flow diagram of an OLT reception level adjustment process.

Next, the OLT reception level adjustment process at S3000 is carried out, following the ONU presence confirmation process at S2000. The following is a description of the OLT reception level adjustment with reference to FIGS. 12 and 13. FIG. 12 is a flow diagram showing the OLT reception level adjustment process.

In the OLT reception level adjustment process at S3000, the reference power setup unit 242 first sets reference power P0 at S3100.

The reference power P0 is set to a minimum value of all the reception power from each ONU 300-1~N stored in the control table 295.

Next, the level setup is carried out for each ONU 300-1~N. Specifically, the object ONU setup unit 234 first selects ONU 300-1 at S3200. Then, the level setup is carried out for ONU 300-1 at S3300. At S3400, it is judged if level setup is carried out for all the ONUs 300-1~N or not. In the case that the level setup is carried out for all the ONUs 300-1~N, the OLT reception level adjustment process at S3000 comes to an end. Here, explanation of steps S3200, S3400 and S3500 is omitted because they can be performed in the same way as steps S2100, S2300 and S2400, respectively.

At S3310, the downstream control signal generation unit 262 of the OLT 200 generates a downstream control signal for the OLT reception level setup and sends it to the ONU 300-*i*. It makes transmission availability "enable" and VOA setup availability "ON," reads out a preset attenuation from the control table 295 and then sets the preset attenuation as the setup attenuation.

The ONU that has received the downstream control signal will change the attenuation at the VOA 310 and transmits an upstream control signal.

At 3320, the OLT 200 measures reception power Pi in response to the received upstream control signal.

Next, at S3330, the power comparison unit 254 compares the reception power Pi with the reference power P0. If the reception power Pi is larger than the reference power P0 (No), the attenuation setup unit 258 increases attenuation by one stage at S3340. Subsequently, at S3310, the downstream control signal generation unit 262 generates a downstream control signal and sends it to ONU 300 300-*i*. The ONU 300-*i* sets the setup attenuation contained in the received downstream control signal as the attenuation at VOA 310 and transmits an upstream control signal.

This process is repeated as long as the reception power Pi is larger than the reference power P0. At a time when the reception power Pi becomes equal to the reference power P0, the adjustment for the ONU 300-*i* comes to an end. In the case that the reception power Pi becomes smaller than the reference power P0, the process may be stopped at that point or after reducing attenuation by one stage.

Figure 13A:
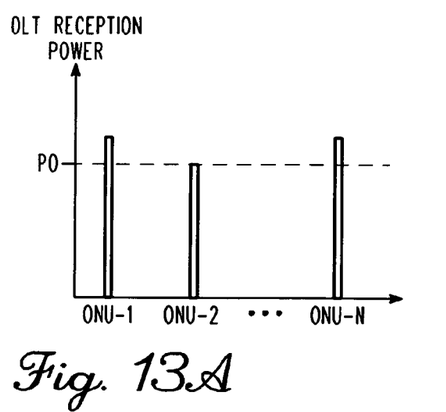
FIG. 13 is a pattern diagram showing the OLT reception level adjustment process.
Figure 13B:
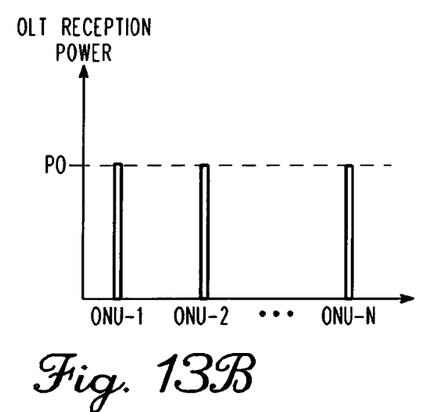

FIG. 13A shows reception power at the OLT 200 before the OLT reception level adjustment process. FIG. 13B shows reception power at the OLT 200 after the OLT reception level adjustment process. The level of optical signals received by the OLT 200 becomes constant by carrying out the OLT reception level adjustment for each ONU 300-1~N.

The aforementioned optical communications network configuration and setup method enables the optical intensity to be made constant at the time of multiplexing at the optical directional coupler by giving each of the plurality of ONUs the attenuation that is the same value for the upstream optical signal and the downstream optical signal and controls the attenuation by the OLT, and the power of a downstream optical signal received by the ONU 300-*i* to be contained within an ONU reception range and the power of an upstream optical signal received by the OLT 200 to be contained within an OLT reception range.

In the PON system, the associated loss of an optical fiber is about 0.5 dB/km. Since it is provided that the maximum length of an optical fiber is 20 km, a distance between an optical directional coupler and each ONU may exceed 10 km. In such a case, the loss of an optical fiber exceeds 5 dB. As a result, a bit error rate may increase in the conventional system if the reception range of the ONU 300 and the OLT 200 is 5 dB. In the present configuration, however, both the upstream optical signal and the downstream optical signal can be contained within a reception range if the receiver and transmitter have the same configuration in the ONU 300 and the OLT 200 because the common attenuation is given to both.

In CDM communication, the signal components (cross correlation components) from another channel become zero in theory if correlation process is carried out on the receiving side. In practice, however, it does not become completely zero due to the imperfection of a device or the like. Accordingly, a large amount of noise may be generated if the power of another channel is larger than that of the own channel, which may lead to inability to communicate.

The present configuration can prevent the aforementioned inability of communication caused by a noise because the optical power of each ONU, which the OLT receives, becomes uniform.

In the present exemplary embodiment, the reference power was set to minimum reception power. However, the reference power is not limited to this embodiment. For example, it may be set to a minimum value of the OLT's reception range.

Nevertheless, if it is set to a minimum value of the reception range, a decline in reception power may lead to inability to receive.

On the contrary, if it is set to minimum reception power, a slight decline in reception power does not lead to inability to receive. Moreover, it is possible to achieve stable transmission and reception of data because of no excess attenuation.

What is claimed is:

1. An optical communications network comprising:
    a plurality of optical network units each including a variable optical attenuator for attenuating a received downstream optical signal and a transmitted upstream optical signal, a transceiver for extracting a downstream control signal from the downstream optical signal and generating the upstream optical signal from an upstream control signal, and an optical network unit controller, and
    an optical line terminal in code division multiplexing communication with the plurality of optical network units and including an optical intensity measuring device for measuring the intensity of a received upstream optical signal, a memory for storing a control table having information about the plurality of optical network units readably and writably, a transceiver for extracting the upstream control signal from the upstream optical signal and generating the downstream optical signal from the downstream control signal, and an optical line terminal controller, wherein
    the control table is configured to store information about a received intensity of an upstream optical signal received from each of the plurality of optical network units and a preset attenuation in the variable optical attenuator at each of the plurality of optical network units that enables the optical line terminal to set an attenuation of the variable optical attenuator at each of the plurality of optical network units.

2. The optical communications network according to claim 1, wherein the optical line terminal controller further includes:
    an object optical network unit setup means for setting an object optical network unit to be controlled;
    an upstream control data extraction means for extracting information about a current attenuation of the object optical network unit contained in the upstream control signal;
    a reference intensity setup means for setting a reference intensity of the upstream optical signal received from the object optical network unit;
    an intensity acquisition means for acquiring the received intensity of the upstream optical signal received from the object optical network as measured by the optical intensity measuring device;
    a control table renewal means for renewing information about the preset attenuation and the reception intensity in the control table;
    an intensity comparison means for comparing the reference intensity with the reception intensity;
    an attenuation setup means for setting as a setup attenuation at least one of the preset attenuation in the control table and an attenuation obtained by changing the preset attenuation; and
    a downstream control signal generation means for generating a downstream control signal that allows providing direction to the object optical network unit about a change of the attenuation at the variable optical attenuator to the setup attenuation.

3. The optical communications network according to claim 1, wherein the variable optical attenuator provides an attenuation having a same value for both the upstream optical signal and the downstream optical signal.

4. The optical communications network according to claim 2, wherein the received intensity setup means sets the reference intensity to a minimum value of the reception intensity contained in the control table.

5. The optical communications network according to claim 1, wherein the optical network unit controller includes:
    a downstream control data extraction means for extracting information about transmission availability, attenuation setup availability and setup attenuation contained in the downstream control signal;
    an attenuation change means for changing the attenuation at the variable optical attenuator to a setup attenuation if information about the attenuation setup availability shows that attenuation setup is enabled; and
    an upstream control signal generation means for generating an upstream control signal containing information about current attenuation in the variable optical attenuator.

6. The optical communications network according to claim 5, wherein the attenuation setup availability shows which of the optical network units and the optical line terminal decides attenuation at the variable optical attenuator of the optical network unit.

7. The optical communications network according to claim 2, wherein
    the control table further contains information about reception of an upstream optical signal from each of the plurality of optical network units;
    the optical line terminal further includes a reception decision means for determining the reception of the upstream optical signal from each of the plurality of optical network units;
    the downstream control signal generation means further generates the downstream control signal for providing the direction to each of the plurality of optical network units about transmission of the upstream control signal; and
    the control table renewal means further renews information about the reception of an upstream optical signal from each of the plurality of optical network units contained in the control table based on results from the reception decision means.

8. The optical communications network according to claim 2, wherein the downstream control signal generation means generates a downstream control signal for providing direction to each of the plurality of optical network units for adjustment of the attenuation at the variable optical attenuator.

9. The optical communications network according to claim 8, wherein
the optical network unit controller further includes a reception decision means for deciding existence of the received downstream optical signal, and a reception level adjustment means for acquiring a minimum attenuation having a minimum value within a receivable range of the downstream optical signal; and
an attenuation setup means changes the attenuation at the variable optical attenuator to the minimum attenuation acquired by the reception level adjustment means.

10. The optical communications network according to claim 9, wherein the setup of attenuation is performed at a time when the power sources of each of the optical network units and the optical line terminal are turned on or at a time when the configuration of the optical communications network is changed.

11. A method for adjusting an intensity of a downstream optical signal received by an optical network unit and an upstream optical signal transmitted by the optical network unit in an optical communications network, wherein one optical line terminal is connected to a plurality of optical network units and wherein code division multiplexing communication is carried out between the optical line terminal and the plurality of optical network units, the method comprising:
at the optical line terminal,
setting a reference intensity for the optical network unit using a control table containing information about the reception intensity of an upstream optical signal received from the optical network unit and a preset attenuation at a variable optical attenuator in the optical network unit; and
adjusting the optical network unit by
setting the preset attenuation read from the control table as a setup attenuation:,
generating a downstream control signal that allows providing direction to the optical network unit about the change of the attenuation at the variable optical attenuator into the setup attenuation,
acquiring the reception intensity of a subsequent upstream optical signal,
comparing the reference intensity with the reception intensity,
increasing the setup attenuation if the reception intensity is larger than the reference intensity as a result of the comparing of the reference intensity with the reception intensity, and
subsequently repeating the generating of a downstream control signal, the acquiring of the reception intensity, the comparing of the reference intensity with the reception intensity and the increasing of the setup attenuation until the reception intensity is no longer greater than the reference intensity.

12. The intensity adjustment method according to claim 11, wherein the setting of a reference intensity comprises setting the reference intensity to a minimum value of the received intensity contained in the control table.

13. The intensity adjustment method according to claim 11, wherein, at the control table,
providing direction to the optical network unit about the transmission of the upstream optical signal before the setting of a reference intensity;
determining an existence of a received upstream optical signal; and
renewing information about the existence of the received upstream optical signal contained in the control table in response to results of the determining existence of the received upstream optical signal.

14. The intensity adjustment method according to claim 13, further comprising providing direction to the optical network unit about reception level adjustment before the providing of direction to the optical network unit.

15. The intensity adjustment method according to claim 14, further comprising, at the optical network unit:
acquiring a minimum value of the attenuation at a variable optical attenuator within a receivable range of a downstream optical signal as the minimum attenuation in response to the direction given by the reception level adjustment; and
changing the attenuation at the variable optical attenuator to the minimum attenuation.

16. An optical line terminal (OLT) for adjusting an intensity of each of a plurality of optical network units (ONUs) in communication therewith, the OLT comprising:
an optical intensity measuring device configured to measure an intensity of upstream optical signals received from the plurality of ONUs;
a memory configured to store a control table having ONU control information about the intensity of the upstream optical signals and about preset attenuation values in variable optical attenuators at each of the plurality of ONUs;
a transceiver configured to receive the upstream optical signals, to extract ONU control signals therefrom and to transmit downstream optical signals including downstream ONU control signals for controlling attenuation of the downstream signals and of the upstream signals received at and transmitted by each of the plurality of ONUs; and
an optical line terminal controller configured to generate the downstream ONU control signals based on the ONU control information stored in the control table and on the upstream ONU control signals extracted by the transceiver for adjusting an attenuation level at each of the variable optical attenuators.

17. The OLT according to claim 16, wherein the optical line terminal controller is configured to adjust the attenuation level at each of the variable optical attenuators to enable each of the variable optical attenuators to provide the same level of attenuation to both the upstream optical signals and the downstream optical signals.

18. The OLT according to claim 16, wherein the optical line terminal controller is configured to adjust the attenuation level at each of the variable optical attenuators to enable each of the variable optical attenuators to contain the intensity of the upstream optical signals and an intensity of the downstream optical signals within a predetermined dynamic range.

19. The OLT according to claim 16, wherein the optical line terminal controller is configured to
set reference intensity levels for the plurality of ONUs based on the ONU control information in the control table and preset attenuation levels at the variable optical attenuators, and
adjust the preset attenuation levels at the variable optical attenuators through repeated comparisons of reception intensity levels extracted from the upstream optical signals with the reference intensity levels until the reception intensity levels are no longer greater than the reference intensity levels.

20. An optical communications network comprising:
a plurality of optical network units each including a variable optical attenuator for attenuating a received downstream optical signal and a transmitted upstream optical signal, and
an optical line terminal in code division multiplexing communication with the plurality of optical network units, wherein
an optical intensity is made constant at the time of multiplexing at an optical directional coupler by giving each of the plurality of optical network units an attenuation that is the same value for the upstream optical signal and the downstream optical signal, and
the attenuation is controlled by the optical line terminal.

* * * * *